(12) United States Patent
Johnson et al.

(10) Patent No.: US 7,997,987 B2
(45) Date of Patent: Aug. 16, 2011

(54) COMPUTER-BASED GAMING TEAMS

(75) Inventors: Jerry Alan Johnson, Medina, WA (US); Johan Peter Hansen, Redmond, WA (US); Michal Bortnik, Seattle, WA (US); Patrick W. O'Kelley, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 484 days.

(21) Appl. No.: 11/335,951

(22) Filed: Jan. 20, 2006

(65) Prior Publication Data
US 2007/0173323 A1    Jul. 26, 2007

(51) Int. Cl.
*A63F 9/24* (2006.01)
*A63F 13/00* (2006.01)
*G06F 17/00* (2006.01)
*G06F 19/00* (2006.01)

(52) U.S. Cl. .......................................... 463/42; 463/40
(58) Field of Classification Search .................... 463/42, 463/40
See application file for complete search history.

(56) References Cited

U.S. PATENT DOCUMENTS

| | | | | |
|---|---|---|---|---|
| 5,083,271 | A | | 1/1992 | Thacher et al. ................. 700/92 |
| 5,779,549 | A | | 7/1998 | Walker et al. .................. 463/42 |
| 6,007,428 | A | * | 12/1999 | Nishiumi et al. ............... 463/36 |
| 6,024,643 | A | | 2/2000 | Begis ............................. 463/42 |
| 6,206,782 | B1 | | 3/2001 | Walker et al. .................. 463/25 |
| 6,352,479 | B1 | | 3/2002 | Sparks, II ....................... 463/42 |
| 6,425,828 | B2 | | 7/2002 | Walker et al. .................. 463/42 |
| 6,839,435 | B1 | | 1/2005 | Iijima et al. .................. 380/251 |
| 7,192,352 | B2 | | 3/2007 | Walker et al. .................. 463/42 |
| 2002/0115488 | A1 | | 8/2002 | Berry et al. ..................... 463/42 |
| 2002/0119824 | A1 | | 8/2002 | Allen .............................. 463/42 |
| 2002/0142842 | A1 | | 10/2002 | Easley et al. ................... 463/42 |
| 2003/0109301 | A1 | | 6/2003 | Chudley et al. ................ 463/23 |
| 2003/0216962 | A1 | * | 11/2003 | Heller et al. ................... 705/14 |
| 2004/0225386 | A1 | | 11/2004 | Thompson et al. ............ 700/92 |
| 2005/0261062 | A1 | | 11/2005 | Lewin et al. ................... 463/42 |
| 2006/0258463 | A1 | * | 11/2006 | Cugno et al. ................... 463/42 |
| 2006/0287106 | A1 | * | 12/2006 | Jensen ............................ 463/42 |

\* cited by examiner

*Primary Examiner* — Melba Bumgarner
*Assistant Examiner* — Jason Pinheiro
(74) *Attorney, Agent, or Firm* — L. Alan Collins; Collins & Collins Incorporated

(57) ABSTRACT

Groups are formed, in a computer-based (e.g., on-line) gaming environment, based on social relationships between players. Teams are formed from members of the group. Team formation is based on a game related interest. Each team is assigned an identity that is maintained within a single game and across multiple sessions of a game. The team can interact within the gaming environment much like an individual user can interact. Teams can play games with other in-group and out-of-group teams. Team members can play games with each other. Team statistics and achievements can be accumulated and aggregated. Team profiles provide information about the team, such as a list of the members of the team. Via team profiles, a member of a team can see information about other members of the team, such as other teams to which they belong. Team members can send and receive intra-team messages.

16 Claims, 14 Drawing Sheets

COMPUTER-BASED GAMING TEAMS

COPYRIGHT NOTICE/PERMISSION

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings hereto: Copyright © 2004, Microsoft Corporation, All Rights Reserved.

TECHNICAL FIELD

The technical field generally relates to gaming and multimedia devices, and more particularly relates to on-line gaming social groups and teams.

BACKGROUND

It is widely accepted that game players tend to enjoy their gaming experiences if they can play with friends or people they like. Further, groups of friends, or social groups in general, tend to enjoy competing with each other or with members of other social groups. For example, a social group of work colleagues could form several bowling teams. The bowling teams join a league and play with other teams in the group and with teams from other groups. Typical on-line game systems do not provide mechanisms to allow or encourage social interaction.

SUMMARY

This Summary is provided to introduce a selection of concepts in a simplified form that are further described below in the Detailed Description Of The Illustrative Embodiments. This Summary is not intended to identify key features or essential features of the claimed subject matter, nor is it intended to be used to limit the scope of the claimed subject matter.

A group of computer-based game players is formed based on social relationships between players. The group is assigned an identity and the identity is maintained within a single game title, across multiple sessions of a game title, and across multiple game titles. Teams are formed from the members of the group. Team formation is based on members' interest in a game title, members' skill levels, or the like. A team is assigned an identity and the identity is maintained within a single game title and across multiple sessions of a game title. Teams can play with other teams in the group, teams can play with teams from other groups, or a combination thereof. Team achievements and statistics are determined and aggregated. Team achievements and statistics also are maintained within a single game title, across multiple sessions of a game title, and across multiple game titles. Team profiles allow members of the group to view information about the teams and team players.

BRIEF DESCRIPTION OF THE DRAWINGS

The foregoing summary, as well as the following detailed description of computer-based gaming teams, is better understood when read in conjunction with the appended drawings. For the purpose of illustrating computer-based gaming teams, there is shown in the drawings exemplary constructions thereof; however, computer-based gaming teams is not limited to the specific methods and instrumentalities disclosed. In the drawings.

DETAILED DESCRIPTION OF ILLUSTRATIVE EMBODIMENTS

Figure 1:
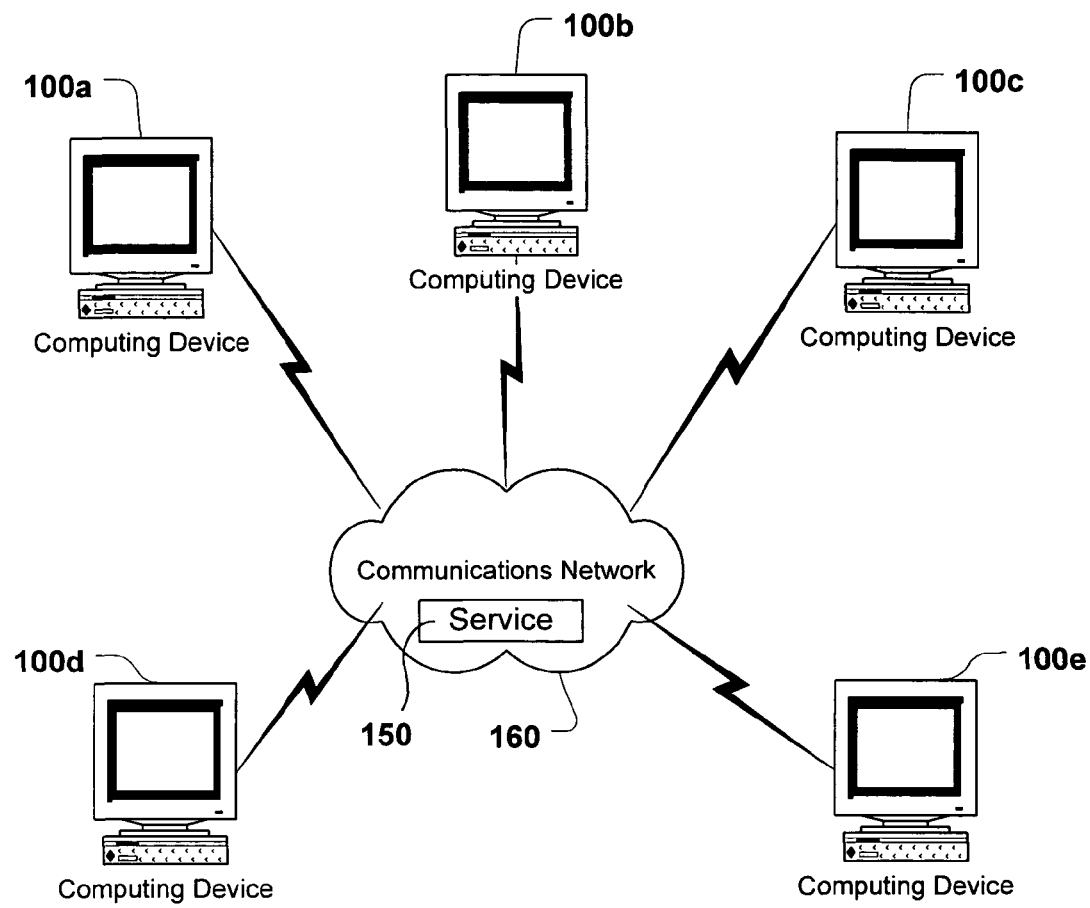
FIG. 1 is a block diagram of an exemplary computer network environment in which aspects of computer-based gaming teams can be implemented.

FIG. 1 is diagram of an exemplary computer network that serves to illustrate aspects of computer-based gaming teams. Here computers 100a-100e can host various ones of the computing objects such as games and other applications. Although the physical environment shows the connected devices as computers, such illustration is merely exemplary and can comprise various digital devices such as PDAs, game consoles, etc. Moreover, communications network 160 can itself comprise a number of computers, servers and network devices such as routers and the like.

There is a variety of systems, components, and network configurations that support distributed computing environments. For example, computing systems can be connected together by wireline or wireless systems, by local networks or widely distributed networks. Currently, many of the networks are coupled to the Internet, which provides the infrastructure for widely distributed computing and encompasses many different networks. Aspects of computer-based gaming teams can be usable to distribute computer-readable instructions, code fragments, applications and the like to various distributed computing devices.

The network infrastructure enables a host of network topologies such as client/server, peer-to-peer, or hybrid architectures. The "client" is a member of a class or group that uses the services of another class or group to which it is not related. Thus, in computing, a client is a process (i.e., roughly a set of instructions or tasks) that requests a service provided by another program. The client process utilizes the requested service without having to "know" any working details about the other program or the service itself. In a client/server architecture, particularly a networked system, a client is usually a computer that accesses shared network resources provided by another computer (i.e., a server). A server is typically a remote computer system accessible over a remote network such as the Internet. The client process can be active in a first computer system, and the server process can be active in a second computer system, communicating with one another over a communications medium, thus providing distributed functionality and allowing multiple clients to take advantage of the information-gathering capabilities of the server.

Clients and servers communicate with one another utilizing the functionality provided by a protocol layer. For example, Hypertext-Transfer Protocol (HTTP) is a common protocol that is used in conjunction with the World Wide Web (WWW) or, simply, the "Web." Typically, a computer network address such as a Uniform Resource Locator (URL) or an Internet Protocol (IP) address is used to identify the server or client computers to each other. Communication among computing devices is provided over a communications medium. In particular, the client and server can be coupled to one another via TCP/IP connections for high-capacity communication.

In general, the computer network can comprise both server devices and client devices deployed in a network environment (in a peer-to-peer environment devices can be both clients and servers). Communications network 160 can be a LAN, WAN, intranet or the Internet, or a combination of any of these that facilitates communication among a number of computing devices 100a-100e. Moreover, communication network 160 can comprise wireless, wireline, or combination wireless and wireline connections. Additionally, the computer network can comprise a distributed computing environment. In such an environment a computing task can be spread over a number of computing devices that are addressable elements in a computer network.

According to an aspect of group interaction in a computer-based gaming environment, communication network 160 can host a service 150 that is accessible from the plurality of computers 100a-100e. The service 150 gathers information and tracks users of computers 100a-100e to provide computing services for all of the users of the service 150.

Figure 2:
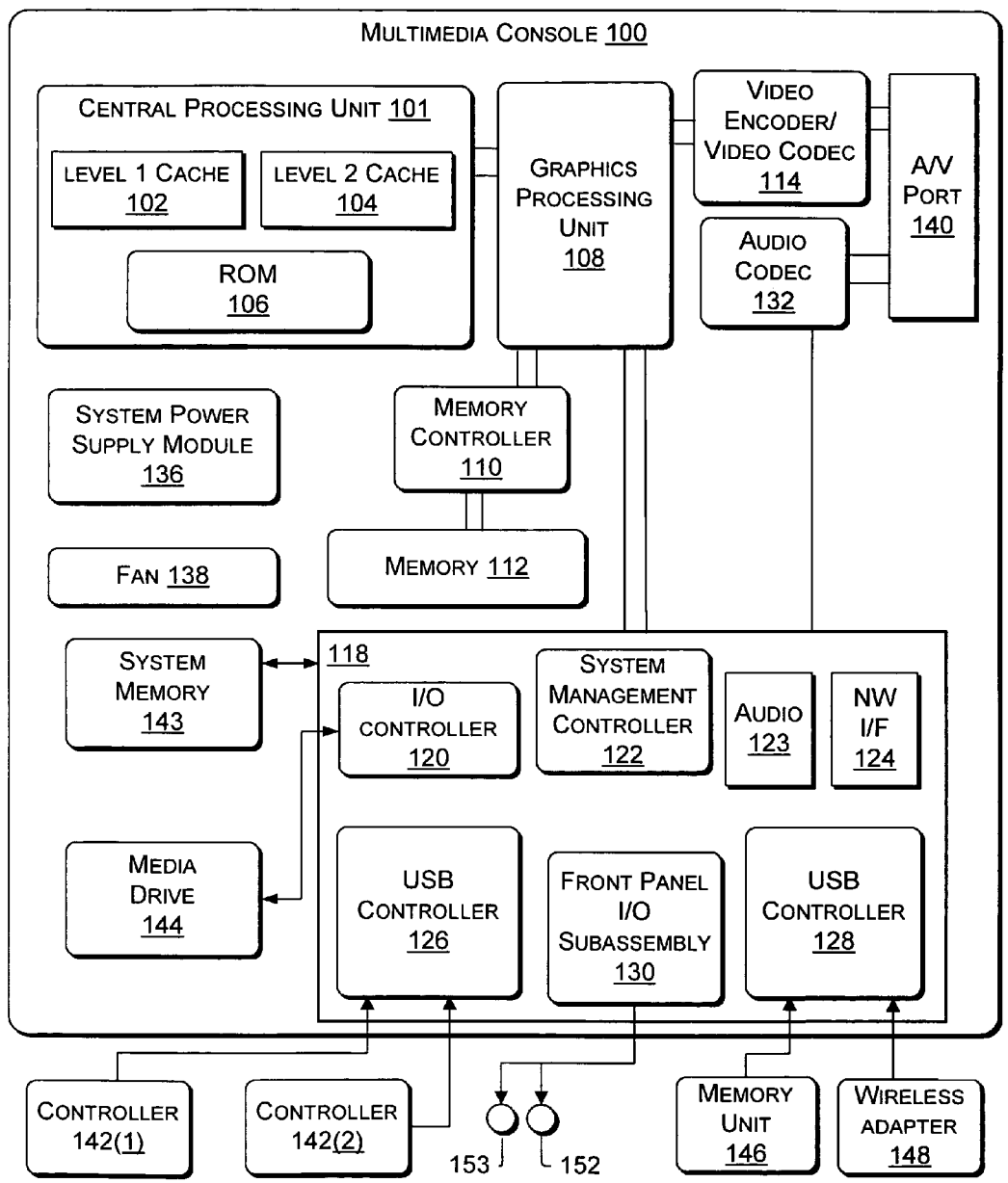
FIG. 2 is a block diagram illustrating an exemplary console that can be incorporated into a network computing environment such as the network computing environment of FIG. 1.

FIG. 2 illustrates functional components of a multimedia/gaming console 100 that can be used as the computers 100a-100e in the network of FIG. 1. The multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 can be provided having more than one core, and thus, additional level 1 and level 2 caches 102 and 104. The flash ROM 106 can store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

In an exemplary embodiment, the multimedia console 100 includes an I/O controller 120, a system management controller 122, an audio processing unit 123, a network interface controller 124, a first USB host controller 126, a second USB controller 128 and a front panel I/O subassembly 130 that can be implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and can be any of a wide variety of various wired or wireless adapter components including an Ethernet card, a modem, a Bluetooth module, a cable modem, and the like.

System memory 143 is provided to store application data that is loaded during the boot process. A media drive 144 is provided and can comprise a DVD/CD drive, hard drive, or other removable media drive, etc. The media drive 144 can be internal or external to the multimedia console 100. Application data can be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 153 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data can be loaded from the system memory 143 into memory 112 and/or caches 102, 104 and executed on the CPU 101. The application can present a graphical user interface that provides a consistent user experience when navigating to different media types available on the multimedia console 100. In operation, applications and/or other media contained within the media drive 144 can be launched or played from the media drive 144 to provide additional functionalities to the multimedia console 100.

The multimedia console 100 can be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 can further be operated as a participant in the larger network community as illustrated in FIG. 1.

According to an aspect of computer-based gaming teams, when a game is executed on console 100, it provides information to a service 150 operating on communications network 160. The service 150 tracks the information for all of the users connected to the service 150 to provide a rich user experience. The service 150 also can allow players to form group and teams, and track information for the groups and teams. The service 150 tracks user/group/teams information across games, consoles, computing devices, etc. By tracking the information for all users/groups/teams of the service 150, the service 150 can aggregate statistics for all users/groups/teams and measure game playing ability, provide a richer user experience by providing information about friends and/or other groups and teams (e.g., what game they are playing and what skill level they have attained), track user/group/team achievements, and generally measure statistics for a game aggregated over a large user community.

In order to provide a consistent data set across games, the system contemplates a schematized, configuration driven process where each game generates a configuration file (according to the schema defined by the service) that defines the game data for a particular game. Through a game configuration process, games describe the data the game generates about each game player. By using the configuration process, the service 150 is able to understand the data as it flows from the game, and is be able to integrate it in meaningful ways with the other data that the service understands to create a rich profile of each user, group, and/or team of the service. The profile will follow the user wherever he goes on the service, i.e., it is game and location independent.

For each user (alternatively referred to as a player or gamer), for each group, and for each team, the service collects a number of pieces of data (called Profile Data) to build the User Profile, Group Profile, and/or Team Profile, in every game session—and even after a game session is concluded. In general, the pieces of the service experience that feed a profile include:

1. What the user/group/team says about himself/herself/itself (including account set up and the construction of an elaborate personal/group profile, including the preferred social gameplay "zone").
2. What others say about the user/group/team (feedback scores and a publicly visible reputation).
3. What the games say about the user/group/team (game configuration and integration of data that comes out of game play to compute a player's skill, among other things).
4. What the system says about the user/group/team (time online, aggregates of games played, Friends list, console behavior etc.)

The system creates a "User Profile," a "Group Profile," and a "Team Profile" which serve as a building block for services and applications that aim to create a social community of gamers and grow relationships among players. The User/Group/Team Profile is the entirety of information (e.g., metadata) related to a specific user/group/team (i.e., the game player's digital identity, the group's digital identity, or the team's digital identity). The User/Group/Team Profile is developed from a set of services that collect and exposes this information in a meaningful way to the community. The User/Group/Team Profile also provides for personalization such that users, groups, and teams can customize and enhance their gaming experience. The User/Group/Team Profile comprises various components, including, but not limited to, a Gamercard, game achievements, and gamer preferences. User profiles can be used to help determine group and team formation. Further, group profiles can be used to help determine team formation.

Figure 3:
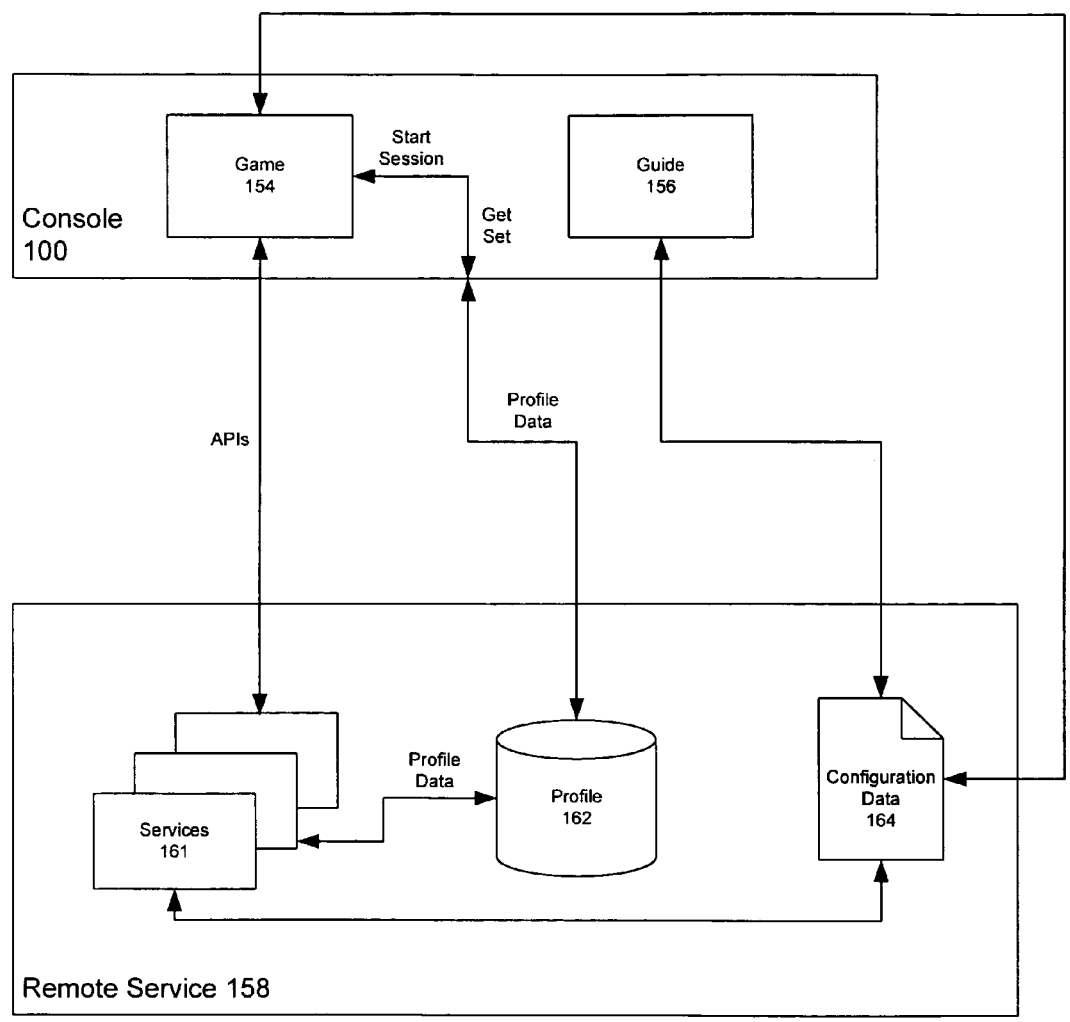
FIG. 3 is a block diagram illustrating the interaction of a console with the remote service.

Referring to FIG. 3, there is illustrated an overview of an exemplary architecture that can be used to implement the User Profile interaction, Group Profile interaction, and Team Profile interaction, as well as user, group, and team interaction with the game session service. The console 100 interacts with a remote service 158 that provides services 161 such as voice/chat, a friends list, matchmaking, content download, roaming, feedback, tournaments, voice messaging, group formation, and updates to gamers. The service 158 also maintains the Profiles in a profile database 162 and configuration data 164 used by the services 158 and games 154. The service 158 collects Profiles, aggregates, processes information supplied by other services 158, and fulfills real-time client requests for retrieving Profile-related services. The Profiles in the database 162 are also used by the games 154 to enable, among other things, personalization and customization, group interaction, team interaction, etc.

Using the console 100, the user can interact with a Guide 156. The Guide 156 provides an interface by which the user can navigate to, and enter, various online areas and options provided by the remote service 158. The configuration data 164 stored by the service can be used to determine features and options provided by the Guide 156. When the game 154 is running, a defined set of APIs (including SetContext, SetProperty, SetAchievement, and Session APIs for writing data about players, groups, and teams, and a number of specialized read APIs for viewing statistics, achievements, and other Profile data) are used to call and interact with the services 158. When requesting Profile information via the APIs, the game 154 can pass a unique identifier of a user/group/team. The service can return a Gamercard (discussed below), game statistics, game achievements, affiliations, game settings, etc. pertaining to a user, group, and/or team. Additional details of the various aspects of the exemplary architecture are provided below.

Service 158 assists in tracking and displaying a wide-variety of in-game statistics, such as number of kills, best lap times, and (importantly, for calculating the skill value needed in Matchmaking) win/loss. These statistics can be provided for a user, for a group of users, and/or for a team of users. All statistics are provided by the various games that a user/group/team plays and provided to the service for inclusion in a player's User Profile, in a group's Group Profile, and/or in a team's Team Profile. For example, a first-person shooter title may want to define a 'Kills' Property to be tracked independently for each 'Map' Context (e.g. 5 Kills on Blood Creek vs. 10 Kills on Battle Range). Also, a group or a team may want to define a similar 'Kills' Property. That information could be displayed as:

| "PER-MAP KILLS" Map | Kills |
|---|---|
| Blood Creek | 5 |
| Battle Range | 10 |

Figure 4:
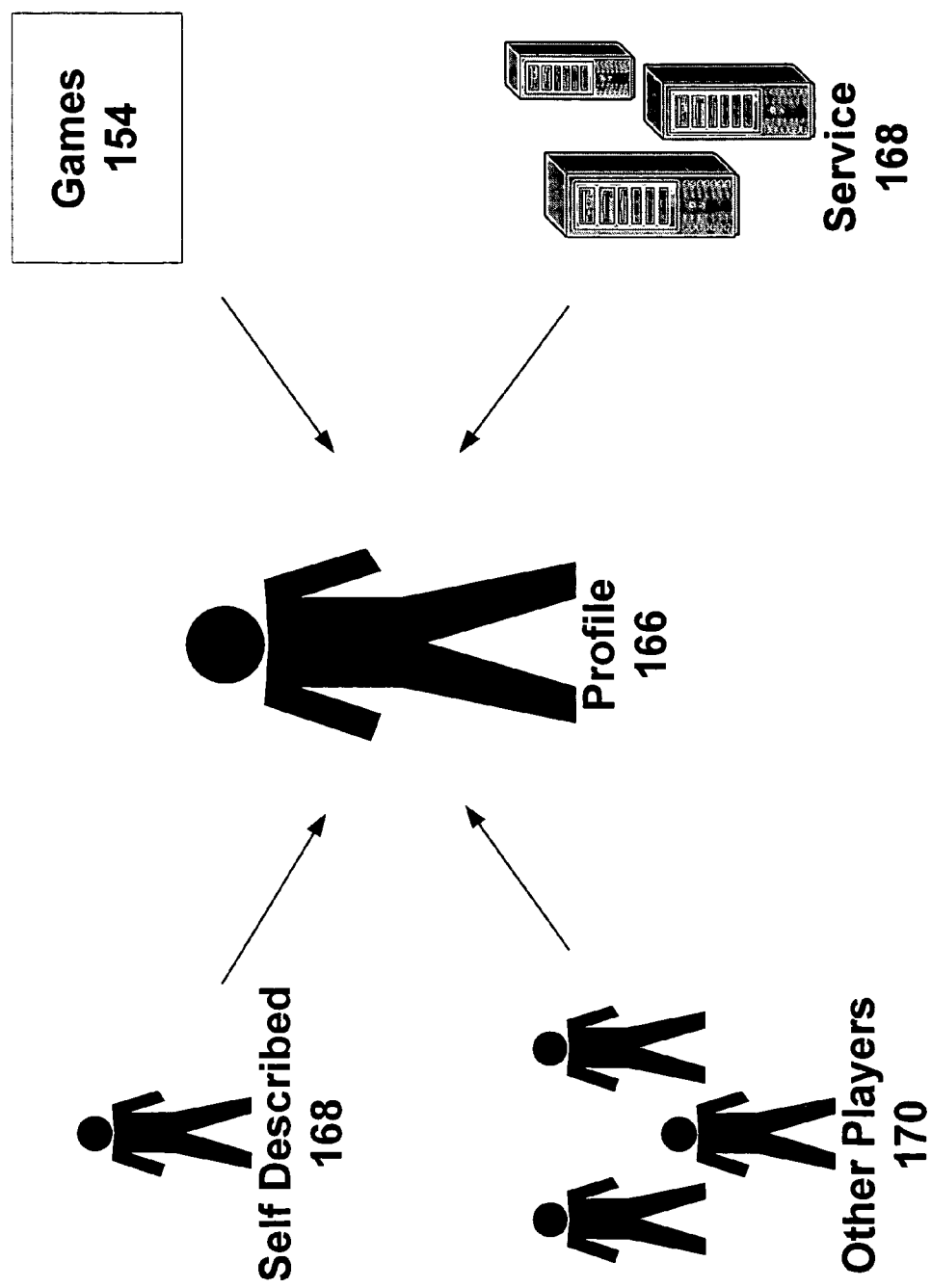
FIG. 4 illustrates sources of information that provide input to a Gamer Profile.

Referring to FIG. 4, the Profile 166 represents a User Profile, a Group Profile, or a Team Profile. The Profile 166 is created when a user creates a profile (selected from the guide 156) and chooses his/her/the group's/the team's unique Gamertag (a unique name), tile (picture/avatar associated with the user or group), and other options during an account sign-up phase. From there, a base Profile 166 is created. The Profile 166 can then be populated from several sources. For example, the Profile 166 can include self-described data 168 from the Profile owner, the group administrator, and/or members of a group. Other gamers 170 can provide feedback regarding the Profile owner. The service 158 can track the gamer's, group's and/or the team's online and offline activity. In addition, the games 154 can report the gamer's, group's, and/or team's statistics and game achievements.

The owner of a Profile can edit his/her/its Profile 166 directly and control who can view each section of the Profile. The Profile 166 can be edited via general fields (e.g., tile, country, language, gender, greeting, etc.) and/or system settings (e.g., voice output, controller vibration, character name, game format, game mode, etc.). Privacy/Opt-out Settings can be tuned for the Profile to, e.g., restrict presence information only to friends, allow game achievements to be visible to all, etc.

The Profile 166 can include feedback provided by other players 170. Feedback helps others learn about a particular gamer, group, or team. For example, if the gamer, group, or team uses foul language or aggressive play in game sessions, other gamers, groups, or teams can submit feedback to the service 158. The feedback mechanism improves user experience by building reputations. Players, groups, and teams can therefore be anonymous, but not unknown because of the accumulated feedback.

In another aspect of the invention, the service 158 and games 154 track online and offline activity of gamers, groups, and teams to provide usage statistics in the Profile 166. When a gamer, group and/or team plays online, a particular game title is added to list of games played that is made visible to others. While offline, the game console 100 and game 154 track the gamer's/group's/team's activity via a mechanism for instrumenting games to collect detailed information about a specific player's/group's/team's in-game statistics and accomplishments. The Profile 166 is updated during the next connection to the service 158 to reflect the offline play. Game achievements can be reported to the service 154 by games via the Gamer Profile, Group Profile, and Team Profile data mechanisms.

As noted above the Profile 166 can be used for customization and preference setting on a global level, as well as a per game level. Gamer, group, and team preferences aid games 154 in choosing defaults for common settings such as game profile name, controller inversion and controller vibration, etc. For example, if a gamer likes using an inverted controller, this preference will be used for new titles as they are played. Games 154 have access to Gamer Profiles, Group Profiles, and Team Profiles via the database 162 and services 161. In addition, game usage data can be mined to tune the game 154 to the user's/group's/team's particular preferences and game features updated after the initial game launch.

A presence service can be included to provide information about user's, group's, or team's whereabouts and activities. Presence information is available to those users, groups, and teams that the gamer/group/team wishes to share it. The Gamer Profile, the Group Profile, and the Team Profile are the primary ways to access the presence information.

It is to be understood that the following description of Gamer Profiles is also appropriately applicable to Group Profiles and Team Profiles, and the following description of Gamercards is appropriately applicable to Groupcards and Teamcards. For the sake of brevity however, Gamer Profiles and Gamercards are described as illustrative embodiments. Referring to FIG. 5 through FIG. 13, the Profile (Group Profile, Team Profile) can be viewed in a number of ways and forms, and is typically displayed in the Gamercard 172 (Groupcard, Teamcard). In various embodiments, a Group Profile comprises a Groupcard and a Team Profile comprises a Teamcard. The Gamercard 172 is the visual representation of the Gamer Profile (e.g., Profile 166 as applied to a gamer) that is available to games on the console 100 and, e.g., the web. The Gamercard 172 serves as a summary or snapshot of a player's Profile 166. Similarly, the Groupcard serves as a summary or snapshot of a group's Profile and the Teamcard serves as a summary or snapshot of a team's Profile. Gamers can use the Gamercard to set up a matchmaking list where gamers are added to a preferred players list to play again in the future.

Figure 5:
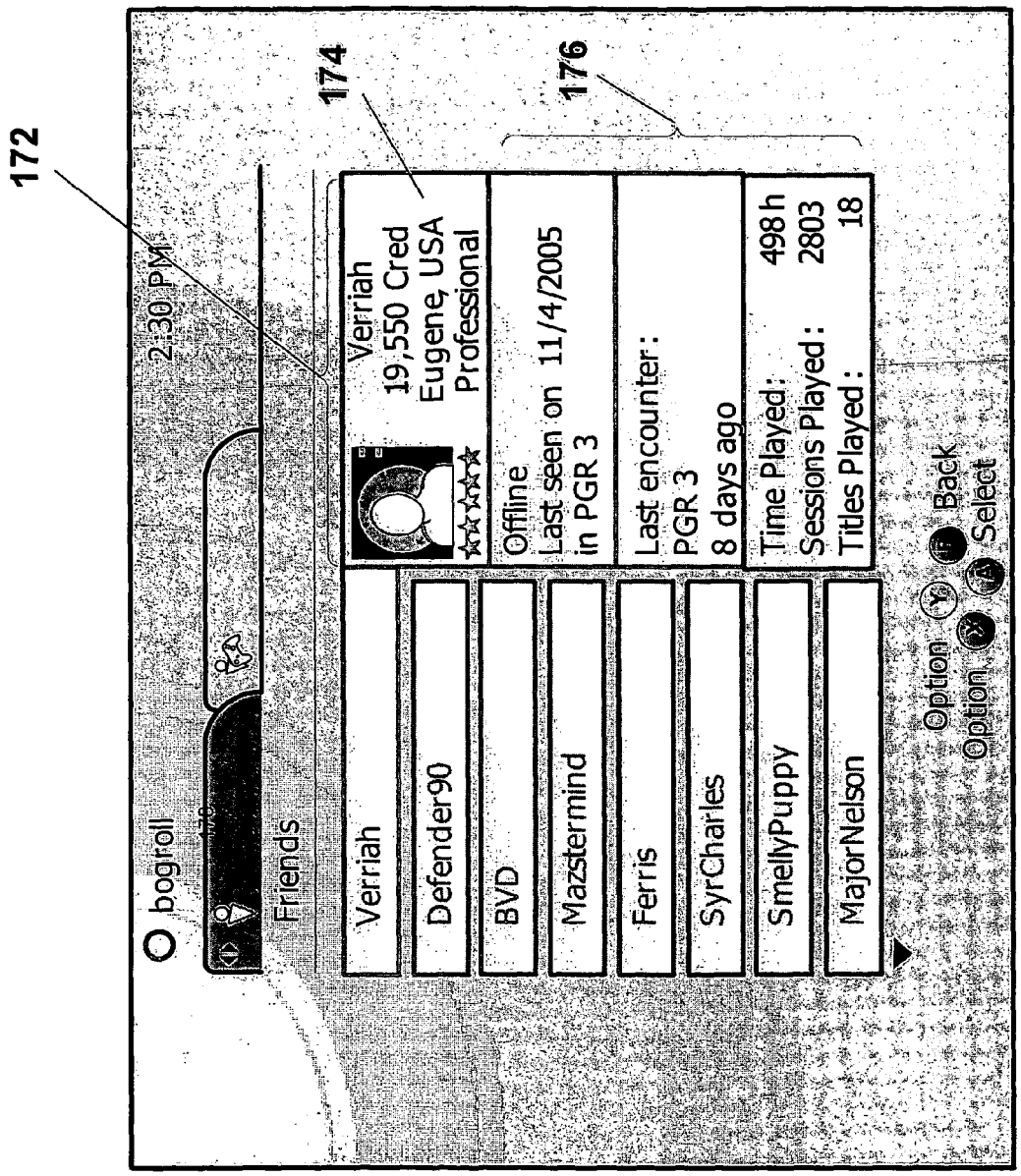
FIG. 5 through FIG. 13 illustrate various graphical user interfaces in accordance with the present invention.

As shown in FIG. 5, the Gamercard 172 can be divided into two regions, a base area 174 and a context-specific (or extended) area 176. It is again emphasized that the following description pertaining to Gamercards is also appropriately applicable to Groupcards and Teamcards. The base area 174 is provides a set of Gamer Profile information in a standard and consistent way across multiple contexts, whereas the extended area 176 can be customized to fit a specific context. Although the Gamercard 172 of FIG. 5 through FIG. 13 are shown in the context of the guide 156, the Gamercard 172 can be visually separated from the rest of the screen and adopt the background color of the screen it is displayed on. In addition, the Gamercard 172 can be temporarily replaced by an animation while it is being loaded for viewing.

The base area 174 can be provided in different variants corresponding to differing contexts, while being a consistent view within each context. For example, an online Gamercard 172 is shown when one player is looking at another player's Gamercard 172 during an online session. The online base area 174 includes details such as the player's Gamertag, gamer tile, overall community rating, gamer Cred (a points-based reward points system), gamer zone, country, membership tier, awards, etc. An offline Gamercard 172 is shown when a player is looking at his/her own Gamercard 172. The offline base area 174 can include a subset of the online base area and can further include information regarding titles played and time played. The base area 174 of a Gamercard 172 is preferably fixed in size, has a consistent, static layout and has a fixed placement of all information elements, such as Tile or Gamer Cred.

The extended area 176 can include a set of Gamercard Actions, such as "View Profile" and "Send Feedback," etc. In an exemplary embodiment, the extended area of the Gamercards is not fixed in size, because it can vary based on the context. As shown in FIG. 5 through FIG. 13 a user can scroll through the list of other users via the guide 156 and a friends list 178. The Gamercard for other users can be displayed as the user scrolls among his/her friends or the user can be presented with an option to see a full view of the Gamer Profile. The full view mode consists of different views of the extended area 176 and can include several sections, such as a Profile Summary, Community Feedback, Game Achievements, Activity, and Social Network. The guide 156 can advance through the list of friends, recent players (and summary sections for each player), a user home page for navigating to various options and settings, etc.

The profile summary includes information regarding number of games played, time played, tile, greeting, etc. The community feedback includes ratings on style, sportsmanship, language, cooperation, etc. The game achievements section includes recent titles, experience points (gamer Cred), time played, game-specific stats and achievements, etc. The activity section includes Gamer Cred earned, sessions played, total time played, active days on the service, etc. The social network includes friends, groups, positive/negative feedback count, etc.

Figure 6:
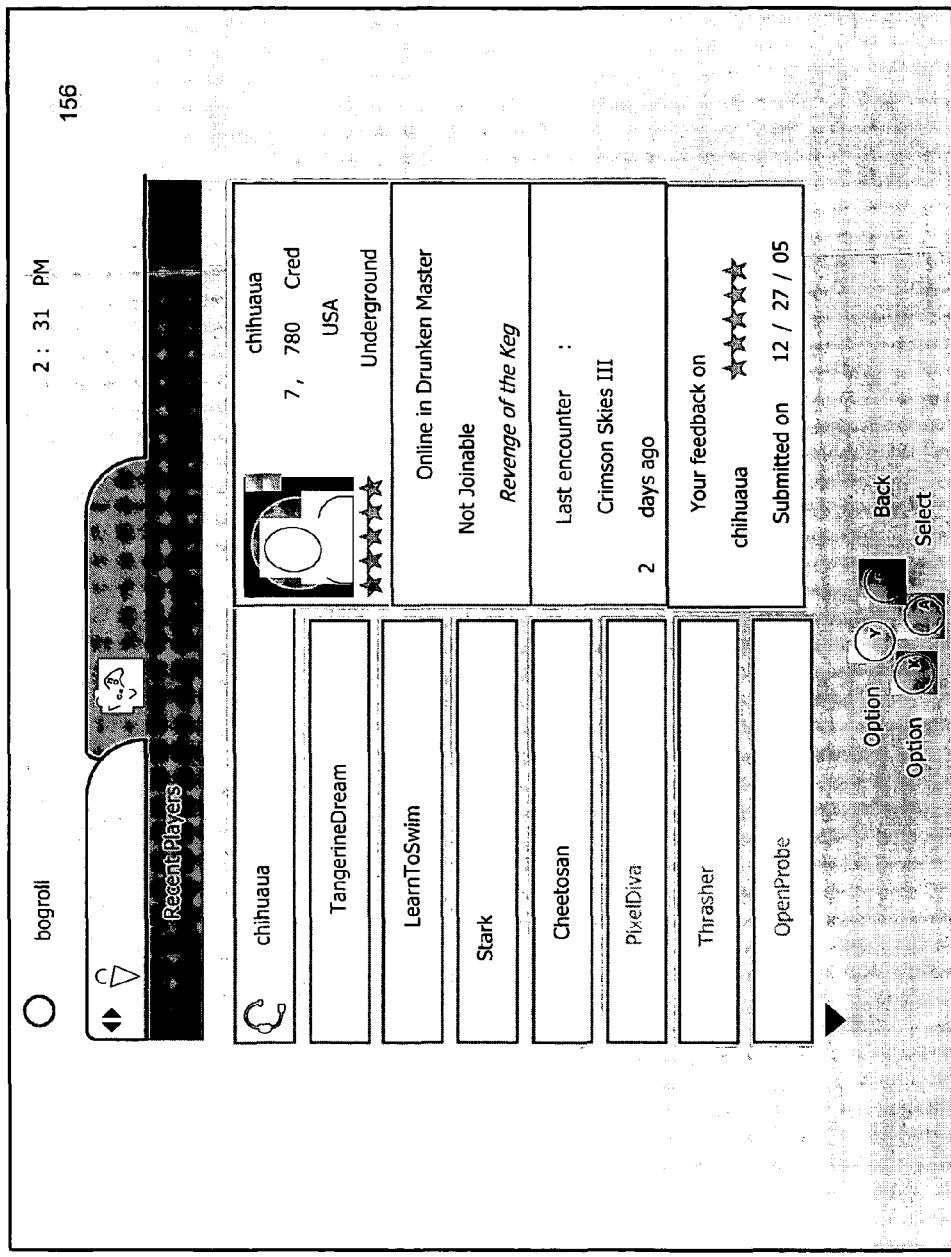
Figure 7:
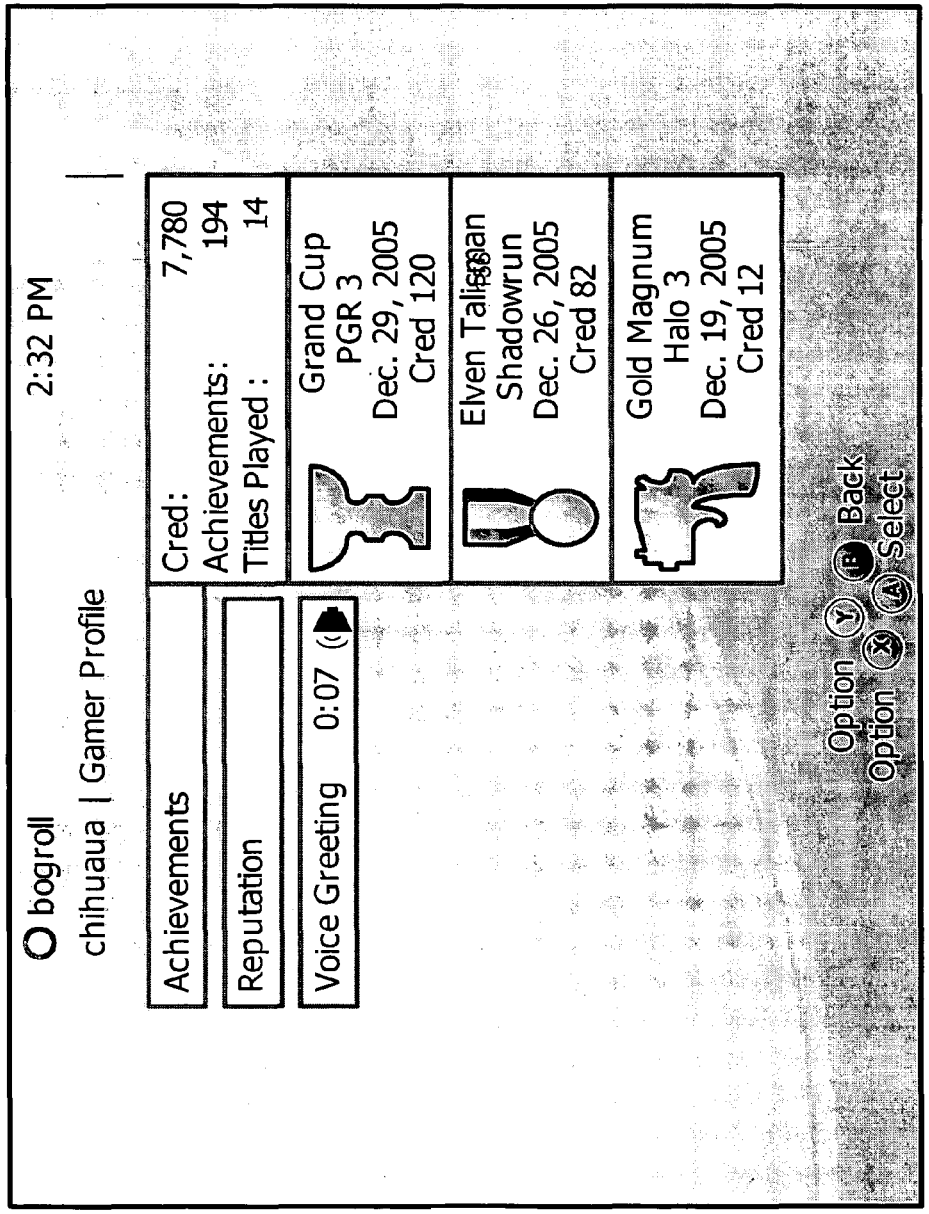
Figure 8:
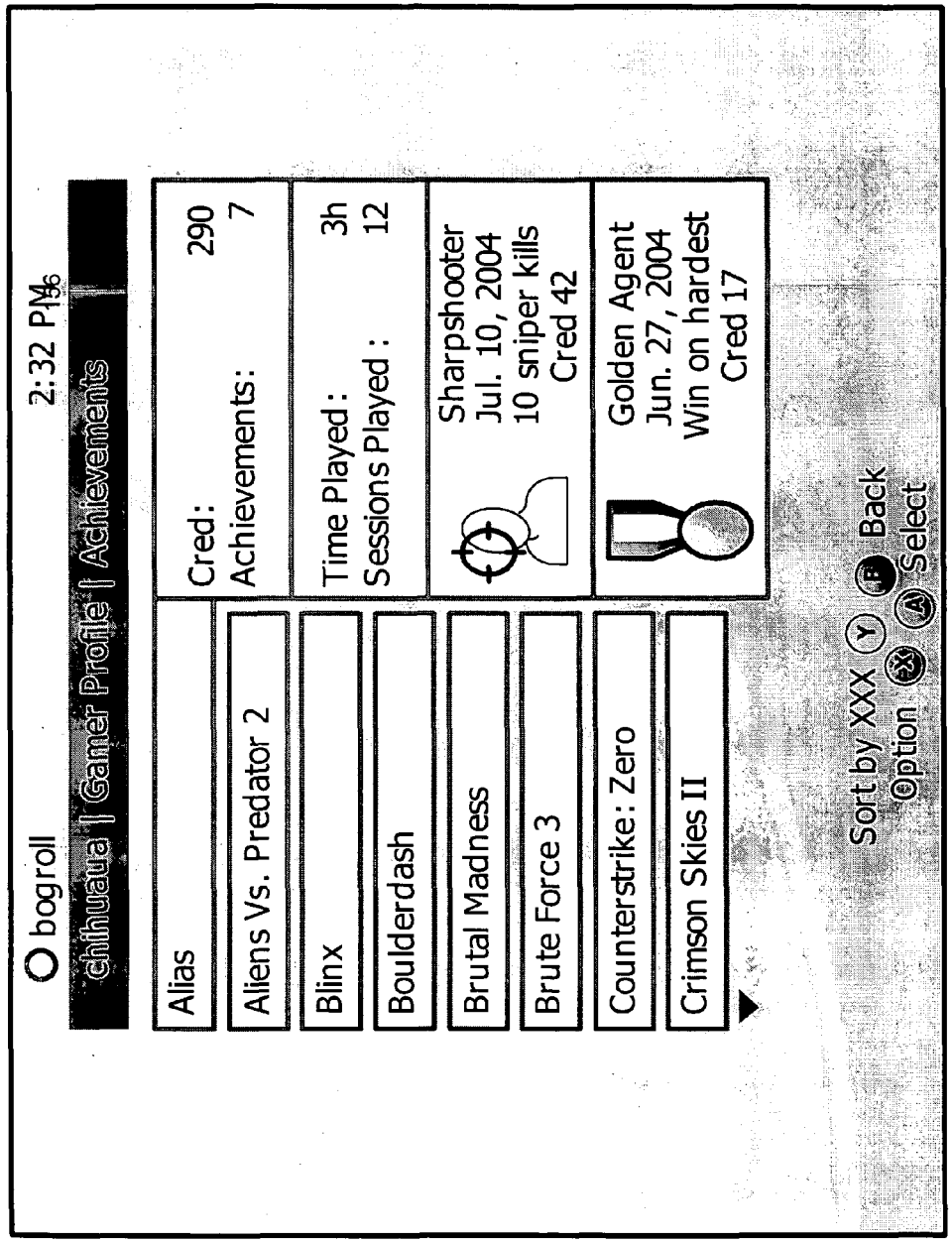
Figure 9:
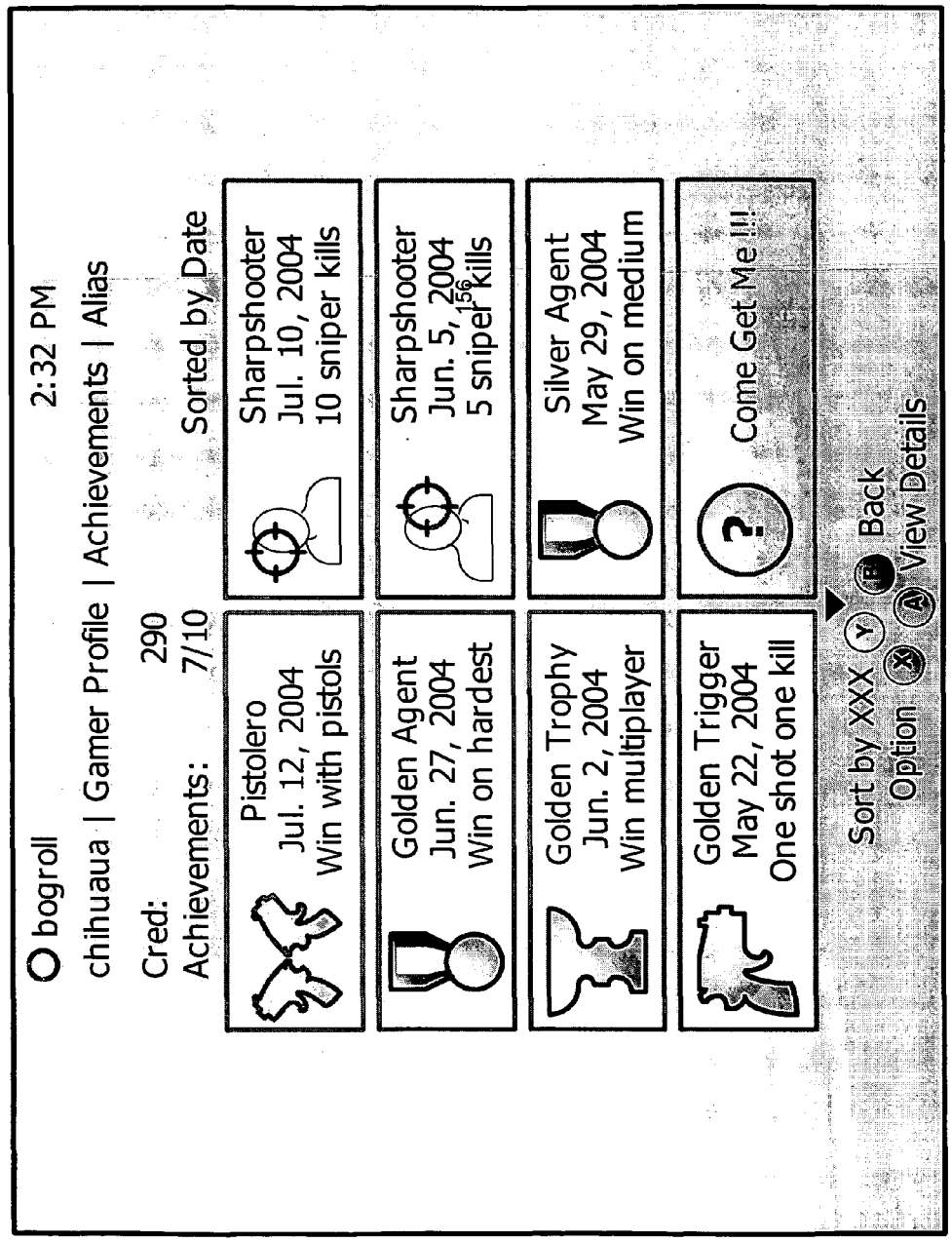

In accordance with the above, FIG. 6 illustrates a list of Recent Players in the guide 156. The Gamercard displayed, when browsing recent players, can show the base area and an extended area that provides information regarding recent games, feedback, and presence of the recent players. FIG. 6 through FIG. 9 illustrate further details that can be obtained about recent players, such as general achievements and gamer Cred (FIG. 7); game specific achievements, gamer Cred, times/sessions played (FIG. 8); and a date-sorted achievement display (FIG. 9).

Figure 10:
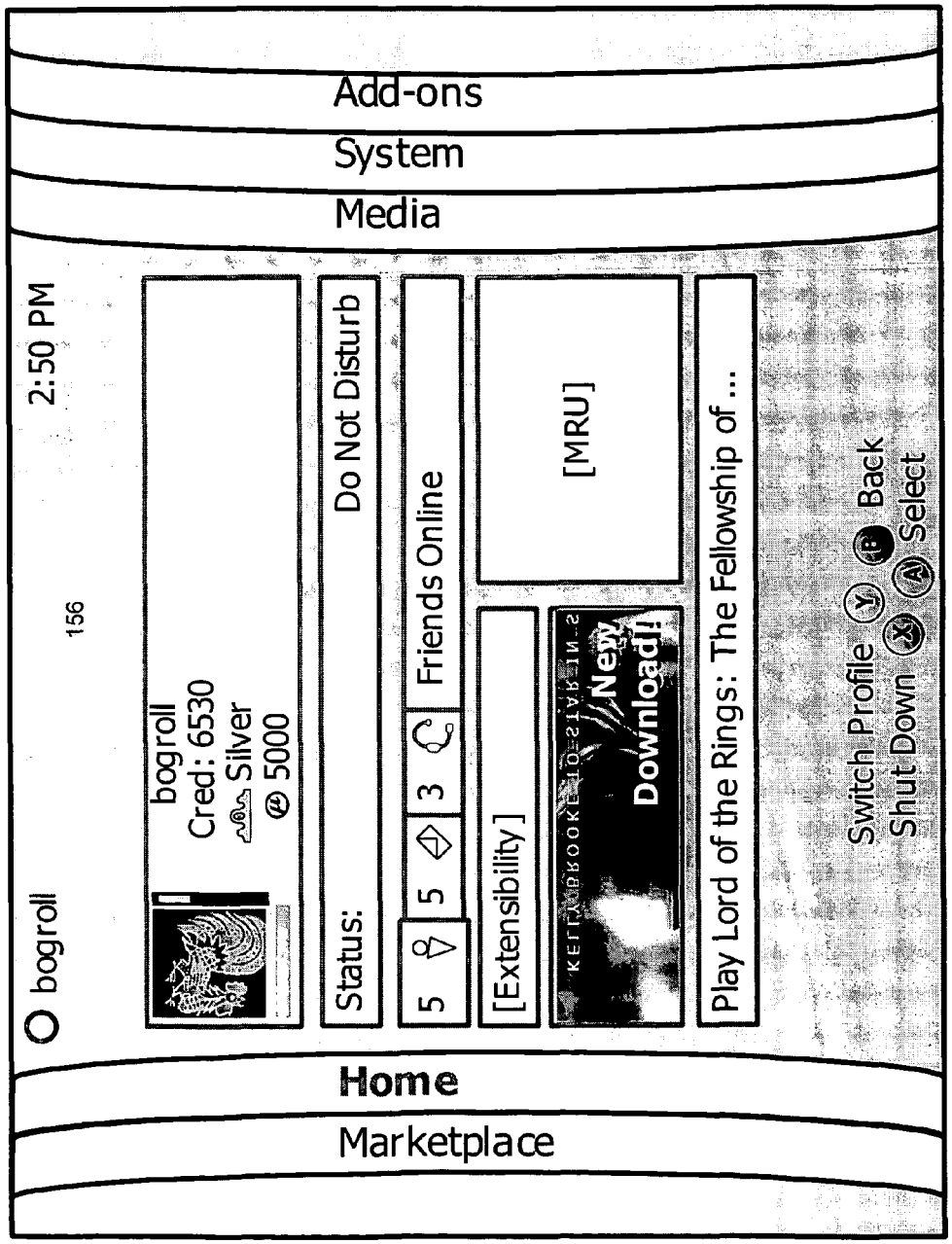
Figure 11:
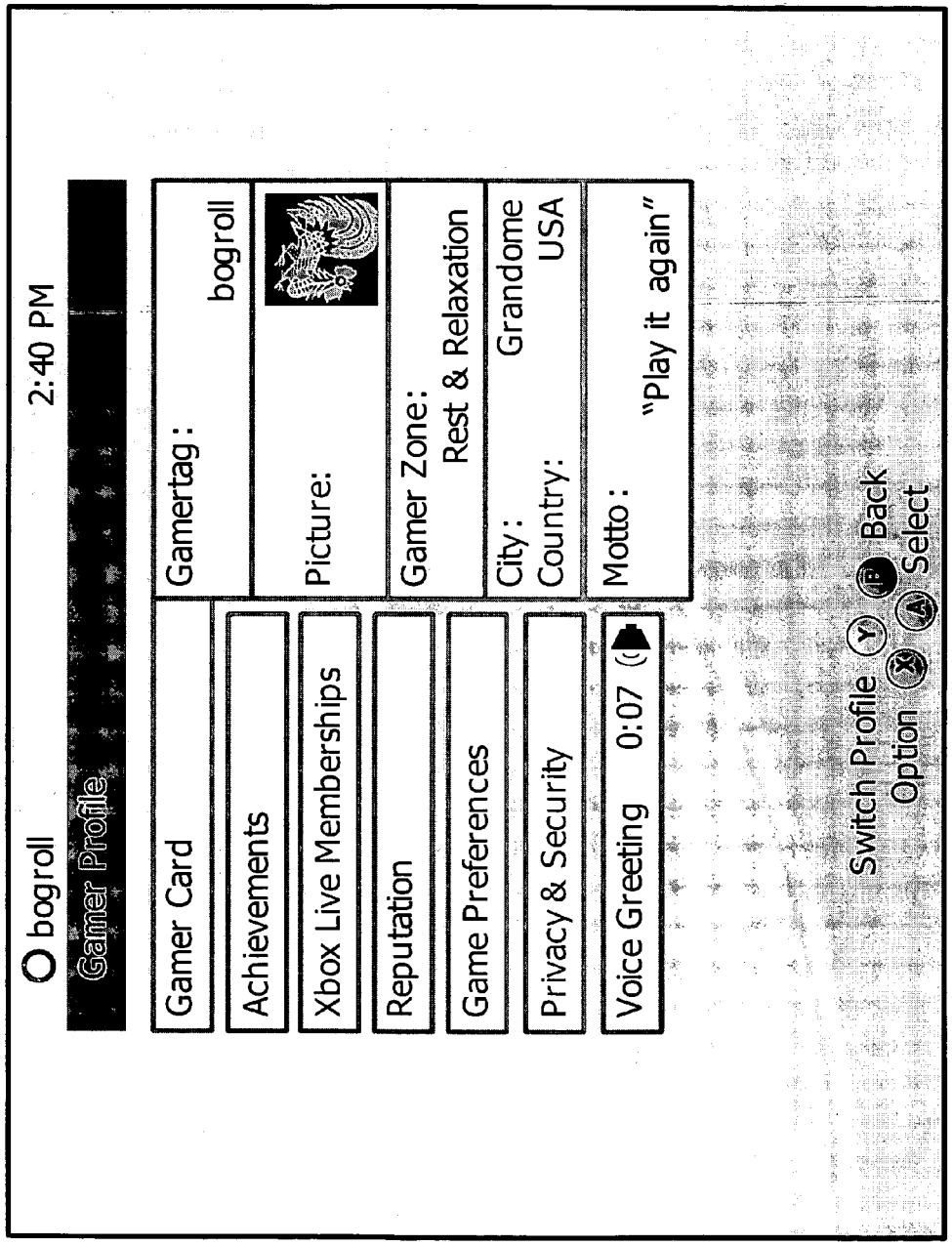
Figure 12:
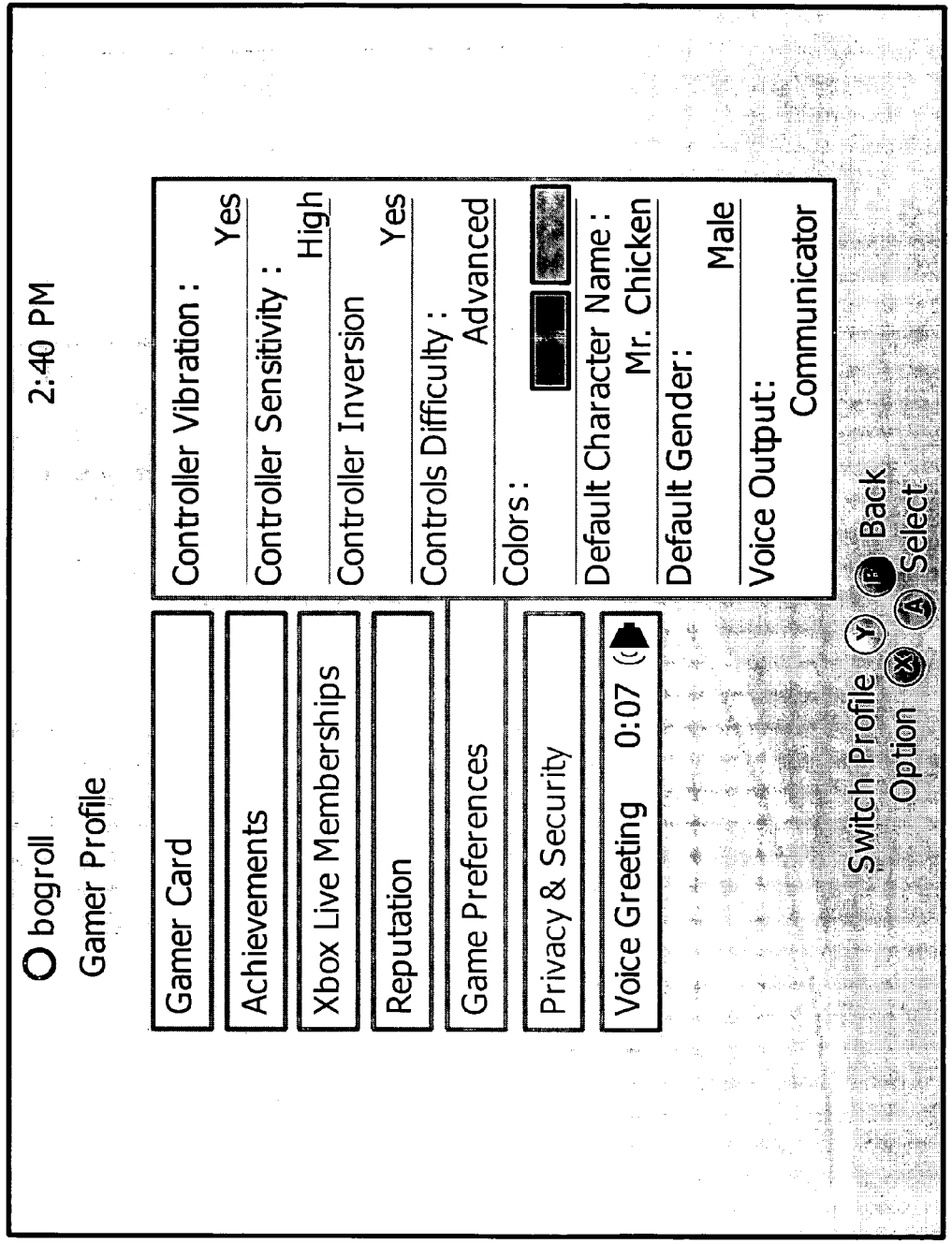
Figure 13:
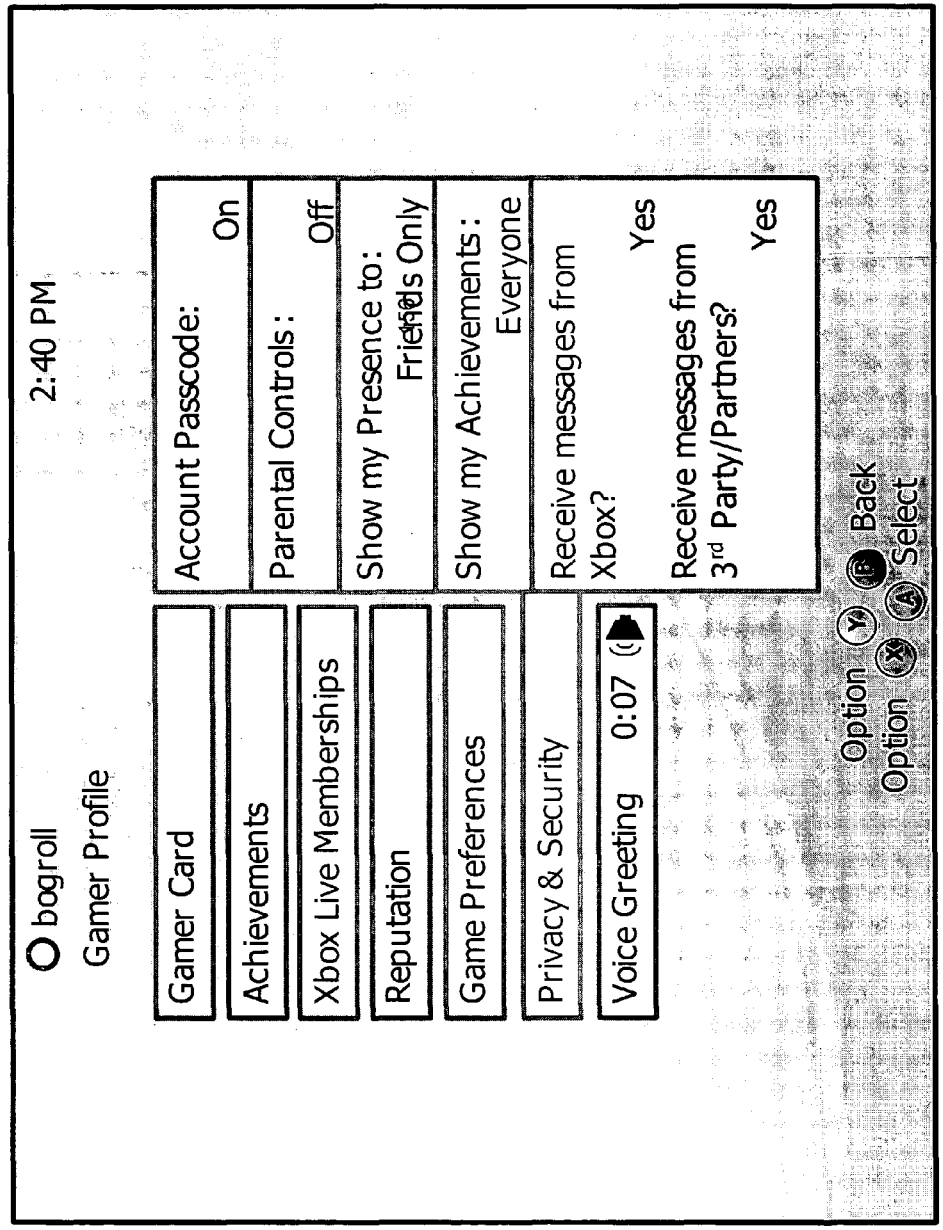

FIG. 10 illustrates an exemplary user home page from which the user can navigate among the various options provided by the service 158, edit Gamercard information, change game settings, set preferences and privacy settings, etc. Such settings and preferences can be accessed using the exemplary user interfaces of FIG. 11 through FIG. 13.

There can be differences, however, between how the guide 156, games 154, and players trigger Gamer Profile viewing. One instance is a user-instantiated Gamercard. Here, if a user receives a request from another gamer, the user can pause the game 154 and bring up the Gamercard 172 to find out who is sending the request. There can also be a game-instantiated Gamercard 172, where a user can select to view the Gamercard 171, which brings up a Gamercard system application.

It is emphasized that the user interfaces (UIs) of FIG. 5 through FIG. 13 are provided for exemplary purposes only and are not intended to limit computer-based gaming groups and teams as recited in the claims.

Group and team interaction enhances both user involvement and the quality of social interactions among users. Utilizing user profiles, group and team interaction provide a mechanism for social and cooperative game play. It is accepted that that gameplay is more enjoyable when a user is playing with people he knows and likes. It is envisioned that playing in groups and teams and playing as a group or team having a group identity or team identity, makes playing with known and liked people much easier, especially as favorite games change over time. It is further envisioned that group and team interaction in a computer-based gaming environment (e.g., on-line gaming) will amplify social dimension of gameplay, meaningfully connect users to one another, help users build shared commitment to play with each other, smooth out the path for new users to become empowered participants in a gaming community, and help users establish group identities within and across games.

A group is an association of users who agree to be a part of the group. A group can comprise users across games. It is envisioned that users having a common social interest will form into a group. For example, siblings in a family could form a group, high school or college buddies could form a group, members of a bowling league or softball league could form a group, or a combination thereof. The common social interest does not have to be game related. Although, players of a particular computer-based game can form a group. A group differs from a Friends list, in that constituents of a Friends list do not necessarily have a social interest in common. Members of a Friends list may not even know each other or realize that both of them are on one player's Friends list. Further, it is possible that members of a player's Friends list may not even like each other. In contrast, members of a group have at least one social interest in common and realize that they all are part of the same group.

A team, as used herein, is a representation of at least a portion of the members of a group. The members of a team are members of a group. A team can include all members of a group, or a sub-set thereof. A team is the portion of a group designated as such for playing a game. A team can be formed based on members of a group being interested in a particular game title or based on common skill levels of members of a group. Teams can be formed based on any appropriate reason, however, it is envisioned that teams will be formed based on anticipated gameplay of a specific game title. Members of teams can overlap. That is, a member of a group can be in more than one team. For example, a group calling themselves the PinHeads could comprise eight members formed from bowling colleagues and work colleagues. Four of the members of the PinHeads could enjoy playing HALO, and form a 4-member team for playing HALO (the HALO team). Also, two of the members of the HALO team could also enjoy playing PGR. Thus, another 4-member team could be formed for playing PGR (the PGR team), where two of the members of the PGR team are also members of the HALO team.

Groups can be formed (created) via a game-instantiated system application or out of a game context. Thus, a player does not have to be playing a game to join or leave a group. Group size is not limited. In an exemplary embodiment, however, group size is limited to conserve system resources. For example, group size could be limited to ten members. When a group is formed, the group is given a group name. The group name is assigned by a user. The service manages the formation of the group. The service assigns the group a Globally Unique Identifier and maintains it for the group. Players can be invited to join a group at any time. Typically, players are invited to join a group by a player that is already a member of the group. Any invited player can join a group.

Teams are formed for gameplay. The first group member to log into a game that supports teams can form a team representing the group. Other group members can then join in the game as a member of the team. The service manages the formation of a team. The service assigns the team a Globally Unique Identifier. Members of teams can be enumerated in an out of game context. Each group member can enumerate all the teams of a group, out of the game context. Team members can be assigned roles, such as captain or officer of the team, for example. In an exemplary embodiment, the game title manages attributes of a team such as the roles of members of a team, the minimum and/or maximum number of team members, the minimum and/or maximum number of team members that can participate in a game session, for example. If a player is a member of multiple teams, the service and/or the game can request the player to identify which team he wants to play on. The service maintains team attributes, team achievements, and team statistics.

Any member of a group can invite any other player to join a group. Any member of a group can invite any other player in the group to join a team. In an exemplary embodiment, one member of a group is assigned the role of group administrator. The group administrator is given the authority to eject members from a group and/or a team. Any group member can leave a group at any time. Any group member can leave a team at any time. In an exemplary embodiment, once a member leaves a group or is ejected from a group, a new invitation from another group member is needed to rejoin. Rejection from a team does not necessarily result in ejection from the group. But, ejection from the group does result in rejection from the team.

In an exemplary embodiment, the service automatically assigns the creator of a group the role of group administrator. One group member can be group administrator at any given time. A group member can determine who the group administrator is by enumerating the group membership. A group administrator can transfer the group administrator role to another group member. That is, the role of group administrator is transferable within a group. If a group administrator transfers the role of group administrator to another group member, that other group member is notified of the transfer by the service via a system message. In an exemplary embodiment, the group administration role comprises two modes: exclusive and shared. In the exclusive group administration mode, only the group administrator can edit group/team settings and/or profiles. In the shared group administrator mode, all group members can edit group/team settings and/or profiles. The group administrator mode can be toggled between the exclusive mode and the shared mode. In an exemplary embodiment, only the group administrator can toggle the group administrator mode.

Unless privacy settings preclude the listing of group and team members, the members of a group and teams can be obtained via the system and/or via a game title. Any player can see all the groups and/or teams to which another player belongs. Any group member can list all the groups in which he/she is a member. Any team member can list all the teams in which he/she belongs. Any game title and/or the service can list all the groups and teams that a player is a member of. Any group member can list all the group members of every group in which he/she is a member. Any team member can list all the team members of every team in which he/she is a member.

Members of a group can send messages to other members of the group. Members of a team can send messages to other members of the team. A message sent to a group is distributed to all members of the group. A message sent to a team is distributed to all members of the team. The UI identifies a message to a group/team as a message to a group/team (rather than a message to a single user). Example messages include a group/team recruitment message, a group/team inactivity warning message, a group/team expiration notification message, and a group administration transfer confirmation message.

A member of a group can review a group presence summary. The group presence summary provides the total number of members in a group and the total number of group members that are currently on-line. A member of a group also can review a group presence list. The group presence list provided more detailed information than provided by the group presence summary. The group presence list provides on-line and off-line information pertaining to group members. Further, a member of a group can enumerate a group presence summary for all groups in which he/she is a member.

A member of a team can review a team presence summary. The team presence summary provides the total number of members in a team and the total number of team members that are currently on-line. A member of a team also can review a team presence list. The team presence list provides more detailed information than provided by the team presence summary. The team presence list provides on-line and off-line information pertaining to team members. Further, a member of a team can enumerate a team presence summary for all teams in which he/she is a member.

Figure 14:
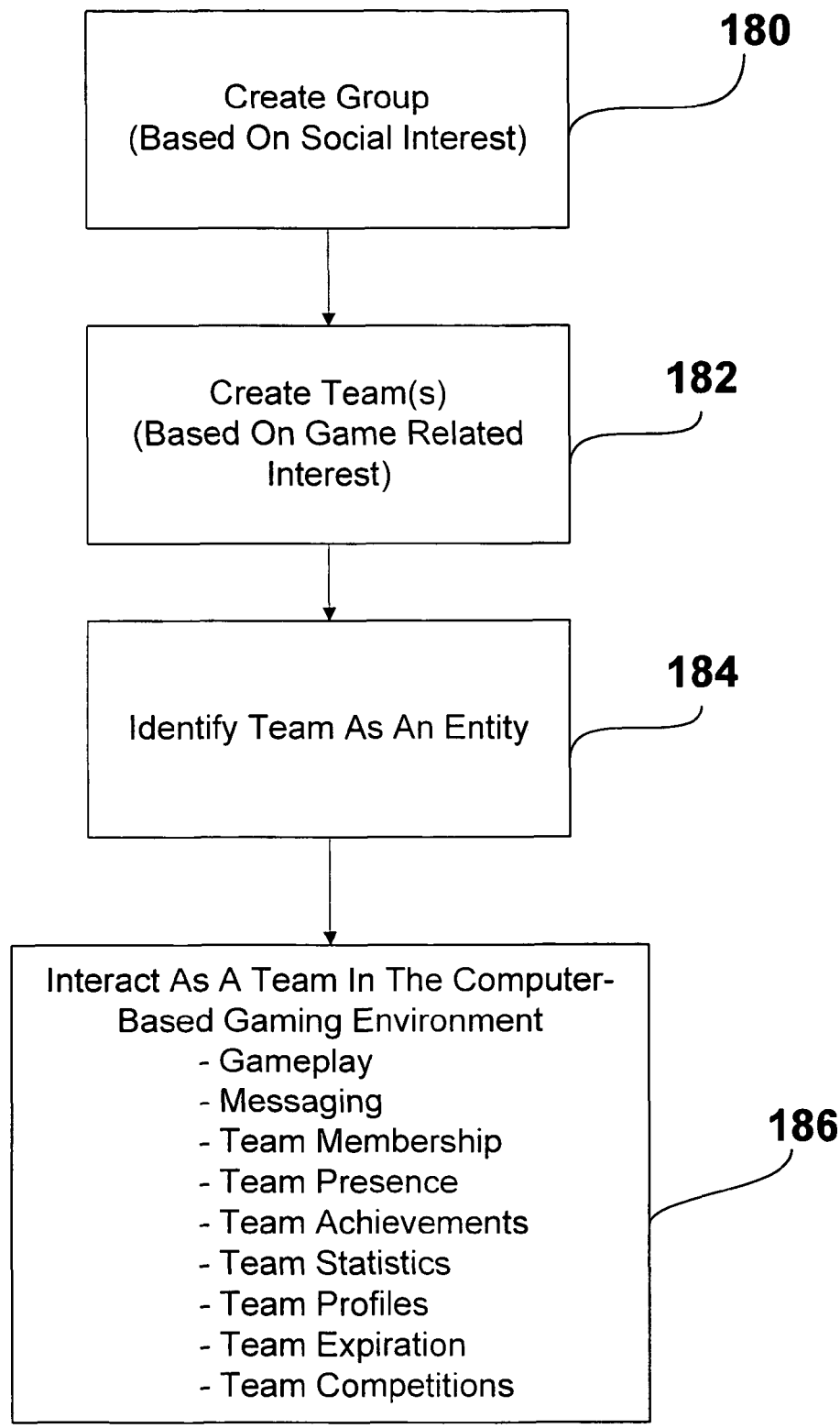
FIG. 14 is a flow diagram of an exemplary process for computer-based gaming teams creation and interaction.

FIG. 14 is an flow diagram of an exemplary process for computer-based gaming teams creation and interaction. A group is formed at step 180. Group formation is based on a social interest. In an exemplary embodiment, at least two members of the group have a common social interest. Examples social interests include family interests, work interests, sports interests, hobby interests, belonging to non-game related club, non-game related interests, or any appropriate social interest. The group can play games as a group, compete as a group, and aggregate statistics as a group. As described above, the service manages the formation of a group. Any user can form a group.

A team, or teams, is formed at step 182. Teams are formed from members of the group. Any number of teams can be formed from a group. Team formation is based on a game related interest. In an exemplary embodiment, at least two members of the team have a common game related interest. Examples game related interests include a specific game title or the skill level of members in a group. For example, in a group, the most skilled players of a specific game title (e.g., HALO) could form a team. The team can play games as a team, compete as a team, and aggregate statistics as a team. As described above, the service manages the formation of a team. Any user of a group can form a team.

The team is assigned an identity, such as a Globally Unique Identifier, at step 184. The team can be treated as a single entity, entitled to many of the benefits enjoyed by individual users. The team interacts within a computer-based gaming environment at step 186. In an exemplary embodiment, the computer-based gaming environment is an on-line gaming environment. Team interaction can comprise any appropriate interaction such as activities related to team membership; team messaging; team presence; team achievements and team statistics; team profiles; administratively managing team; team expiration; and team competitions, for example.

An exemplary scenario is provided to illustrate aspects of group and team interaction in a computer-based gaming environment. In this exemplary scenario, a player, G-Man, has a reputation for being the ring-leader who gets his friends together to play on-line games. When G-Man notices the Groups page in the Guide, G-Man creates a Group of his own. G-Man names the group H-Group. G-Man invites all his friends to join the group. A few days later, when his seven best friends accept the invites, G-Man schedules the first in the long series of H-Group game nights. In the text of the message, G-Man specifies Thursday 8:00 PM to Midnight and suggests PGR3 as the starting game title.

When 8:00 PM on Thursday rolls around, G-Man takes a peek at his Group presence information and sees that 3 of 9 members are on-line. G-Man invites them all into a chat.

None of the other members of H-Group can understand why D-Blue invited his neighbor to join H-Group. D-Blue's neighbor is obnoxious; he doesn't like any of the games that H-Group likes to play. Tired of his constant complaining, G-Man expels D-Blue's neighbor from H-Group.

A few weeks later, H-Group begins to sense that a group identity is developing. G-Man proposes that their latest Halo trophy image represent the H-Group 'in public'. In the Guide, G-Man edits the Group Profile, adding the Tile and recording a Group Motto.

D-Blue doesn't like the Group Motto and goes into the Group Profile to change it himself. As a result, a brief flame war erupts between the members of H-Group. Fed up with the situation, G-Man takes control and flips the Group Administrative Mode from Shared to Exclusive. From now on only G-Man can edit the Group Profile.

The following summer, G-Man takes off to backpack in Australia and transfers the Administrative controls to D-Blue. But, because D-Blue feels that he is so much better than the rest of the members of H-Group, D-Blue loses his interest in playing with H-Group. No one else takes initiative and after 30 days of inactivity H-Group gets a message that the group will expire in 30 days if inactivity continues.

Working to improve his racing skills G-Man schedule a FORZA 2 session. FORZA 2 does not support team gameplay. But, FORZA 2 does allow eight players to race against each other. G-Man creates one of these sessions and sends an invitation to the group, H-Group, to join him.

Game after game, members of H-Group are becoming more enthusiastic about group interaction. Arguably the best shooters of H-Group, is D-Blue. D-Blue begins to wonder about challenging other Groups to play. He scouts out the overall rankings for Groups to find suitable opponents.

D-Blue is the first member of H-Group to obtain the latest game title: Perfect Dark Zero 2 (PDZ 2). PDZ 2 asks D-Blue if he wants to create a team. D-Blue decides to create a PDZ 2H-Group team. Because no PDZ 2H-Group team has previously been formed, D-Blue, via the game title and the system, provide team information. D-Blue assigns himself the role of captain of the PDZ 2H-Group team. G-Man is the next player to sign in to PDZ 2. G-Man is informed that D-Blue has created a PDZ 2H-Group team. G-Man is asked if he wants to join the team, and G-Man says yes. G-Man tries to assign himself the role of captain, but sees that D-Blue has already taken that position. So, G-Man assigns himself the role of an officer of the PDZ 2H-Group team. Finally, after another lost challenge match with a team from another group, decides to take radical steps. In an attempt to improve the teams over standing, D-Blue ejects the worst three players from the team. The three ejected members of the PDZ 2H-Group team, however, remain members of H-Group.

Those of ordinary skill in the art will understand that there are various modifications that will fall within the scope of the appended claims. While computer-based gaming teams have been described in connection with the illustrative embodiments of the various Figures, it is to be understood that other similar embodiments can be used or modifications and additions can be made to the described embodiments for performing the same function of computer-based gaming teams without deviating therefrom.

What is claimed:

1. A method for computer-based gaming team interaction, the method comprising:
   forming a group representing computergame players;
   receiving an indication for each of the computergame players in the group indicating agreement to be a group member of the group, wherein the group members share at least one social interest in common, and wherein the social interest is not required to be game-related, and wherein the group is not directly associated with a game;
   forming a team representing at least a portion of the group members wherein the team members of the team share at least one game-related interest in common, and wherein at least a first computergame player of the group is not a member of the team, and wherein a team member ejected from the team remains a group member, but a team member ejected from the group is also ejected from the team;
   generating a team identity for the team;
   creating a plurality of entity profiles that include a group profile that represents the group, and a distinct team profile that represents the team, and distinct gamer profiles, wherein each distinct gamer profile uniquely represents one of the computergame players, and
      wherein each of the group profile and the team profile and the gamer profiles is configured to include its own calculated skill value and its own friends list and its own publically-visible reputation, and
      wherein each publically-visible reputation is based on feedback from other entities, and
      wherein each friends list is configured for scrolling through entities listed in the each friends list, and
      wherein each of the listed entities corresponds to one of the plurality of entity profiles, and
      wherein a visual representation of various of the plurality of entity profiles that correspond to the listed entities is displayed in accordance with the scrolling; and
   wherein the method is performed by a computer.

2. A method in accordance with claim 1, wherein the at least one game-related interest comprises a skill level of a group member and an indication of a group member's interest in a game title.

3. A method in accordance with claim 1, wherein said at least one social interest comprises a non-game related interest.

4. A method in accordance with claim 1, wherein said team identity is maintained across multiple sessions of a game.

5. A method in accordance with claim 1, further comprising:
   determining game performance statistics for individual members of the team; and
   determining game performance statistics for the team in accordance with the determined performance statistics for individual members of the team.

6. A method in accordance with claim 1, further comprising providing team-specific information that is observable by all group members.

7. At least one computer-readable device having computer-executable instructions that, when executed by a computer, cause the computer to perform a method comprising:
   forming a group representing computergame players;
   receiving an indication for each of the computergame players in the group indicating agreement to be a group member of the group, wherein the group members share at least one social interest in common, and wherein the social interest is not required to be game-related, and wherein a group is not directly associated with a game;
   forming a team representing at least a portion of the group members wherein the team members of the team share at least one game-related interest in common, and wherein at least a first computergame player of the group is not a member of the team, and wherein a team member ejected from the team remains a group member but a team member ejected from the group is also ejected from the team;
   creating a plurality of entity profiles that include a group profile that represents the group, and a distinct team profile that represents the team, and distinct gamer profiles, wherein each distinct gamer profile uniquely represents one of the computergame players, and
      wherein each of the group profile and the team profile and the gamer profiles is configured to include its own calculated skill value, and its own friends list, and its own publically-visible reputation, and
      wherein each publically-visible reputation is based on feedback from other entities, and
      wherein each friends list is configured for scrolling through entities listed in the each friends list, and
      wherein each of the listed entities corresponds to one of the plurality of entity profiles, and
      wherein a visual representation of various of the plurality of entity profiles that correspond to the listed entities is displayed in accordance with the scrolling; and
   generating a team identity for the team.

8. The at least one computer-readable device of claim 7, wherein the at least one game-related interest comprises a skill level of a group member and an indication of a group member's interest in a game title.

9. The at least one computer-readable device of claim 7, wherein the at least one social interest comprises a non-game related interest.

10. The at least one computer-readable device of claim 7, wherein the team identity is maintained across multiple sessions of a game.

11. The at least one computer-readable device of claim 7, the method further comprising:
   determining game performance statistics for individual members of the team; and
   determining game performance statistics for the team in accordance with the determined performance statistics for individual members of the team.

12. The at least one computer-readable device of claim 7, the method further comprising providing team-specific information that is observable by all group members.

13. A computing device comprising:
   a processor; and
   a computer-readable storage medium operatively coupled to the processor, the computer-readable storage medium comprising instructions that, when executed by the processor, configure the computing device to:
form a group representing computergame players;
receive an indication for each of the computergame players in the group indicating agreement to be a group member of the group, wherein the group members share at least one social interest in common, and wherein the social interest is not required to be game-related, and wherein a group is not directly associated with a game;
form a team representing at least a portion of the group members wherein the team members of the team share at least one game-related interest in common, and wherein at least a first computergame player of the group is not a member of the team, and wherein a team member ejected from the team remains a group member but a team member ejected from the group is also ejected from the team; and
create a plurality of entity profiles that include a group profile that represents the group, and a distinct team profile that represents the team, and distinct gamer profiles, wherein each distinct gamer profile uniquely represents one of the computergame players, and wherein each of the group profile and the team profile and the gamer profiles is configured to include its own calculated skill value, and its own friends list, and its own publically-visible reputation, and
wherein the publically-visible reputation is based on feedback from other entities, and
wherein each friends list is configured for scrolling through entities listed in the each friends list, and
wherein each of the listed entities corresponds to one of the plurality of entity profiles, and
wherein a visual representation of various of the plurality of entity profiles that correspond to the listed entities is displayed in accordance with the scrolling.

14. A computing device in accordance with claim 13, wherein the at least one game-related interest comprises a skill level of a group member and an indication of a group member's interest in a game title.

15. A computing device in accordance with claim 13, wherein the at least one social interest comprises a non-game related interest.

16. A computing device in accordance with claim 13, wherein the computing device is further configured to track statistics defined by a group member.

\* \* \* \* \*